United States Patent [19]
Yen

[11] Patent Number: 5,231,530
[45] Date of Patent: Jul. 27, 1993

[54] LIQUID DISPLAY DEVICE FOR REGULATING THE LIGHT PASSING THROUGH

[76] Inventor: Chou Yen, Fl. 4, No. 107, Shiow-Feng St., Chung Ho City, Taipei Hsien, Taiwan

[21] Appl. No.: 936,612

[22] Filed: Aug. 26, 1992

[51] Int. Cl.⁵ .................................................. G02B 26/02
[52] U.S. Cl. ......................................... 359/228; 359/886
[58] Field of Search ............... 359/227, 228, 230, 885, 359/886, 889, 892, 894

[56] References Cited

U.S. PATENT DOCUMENTS

| | | | |
|---|---|---|---|
| 2,433,456 | 12/1947 | Jansen | 359/228 |
| 4,044,519 | 8/1977 | Morin et al. | 359/228 |
| 4,178,077 | 12/1979 | Te Velde | 359/228 |
| 4,370,837 | 2/1983 | Larguia | 359/228 |
| 4,636,785 | 1/1987 | LePesant | 359/228 |

FOREIGN PATENT DOCUMENTS 2823458 12/1978 Fed. Rep. of Germany ...... 359/228

Primary Examiner—Bruce Y. Arnold
Assistant Examiner—James Phan

[57] ABSTRACT

A liquid display device includes a transparent display board assembly having a flat, water-tight compartment on the inside, and a piston pump assembly controlled by a reversible motor to reciprocate two or more kinds of liquids of different colors and different specific gravities in changing the transparency of the transparent display board assembly so as to regulate the light passing through.

2 Claims, 4 Drawing Sheets

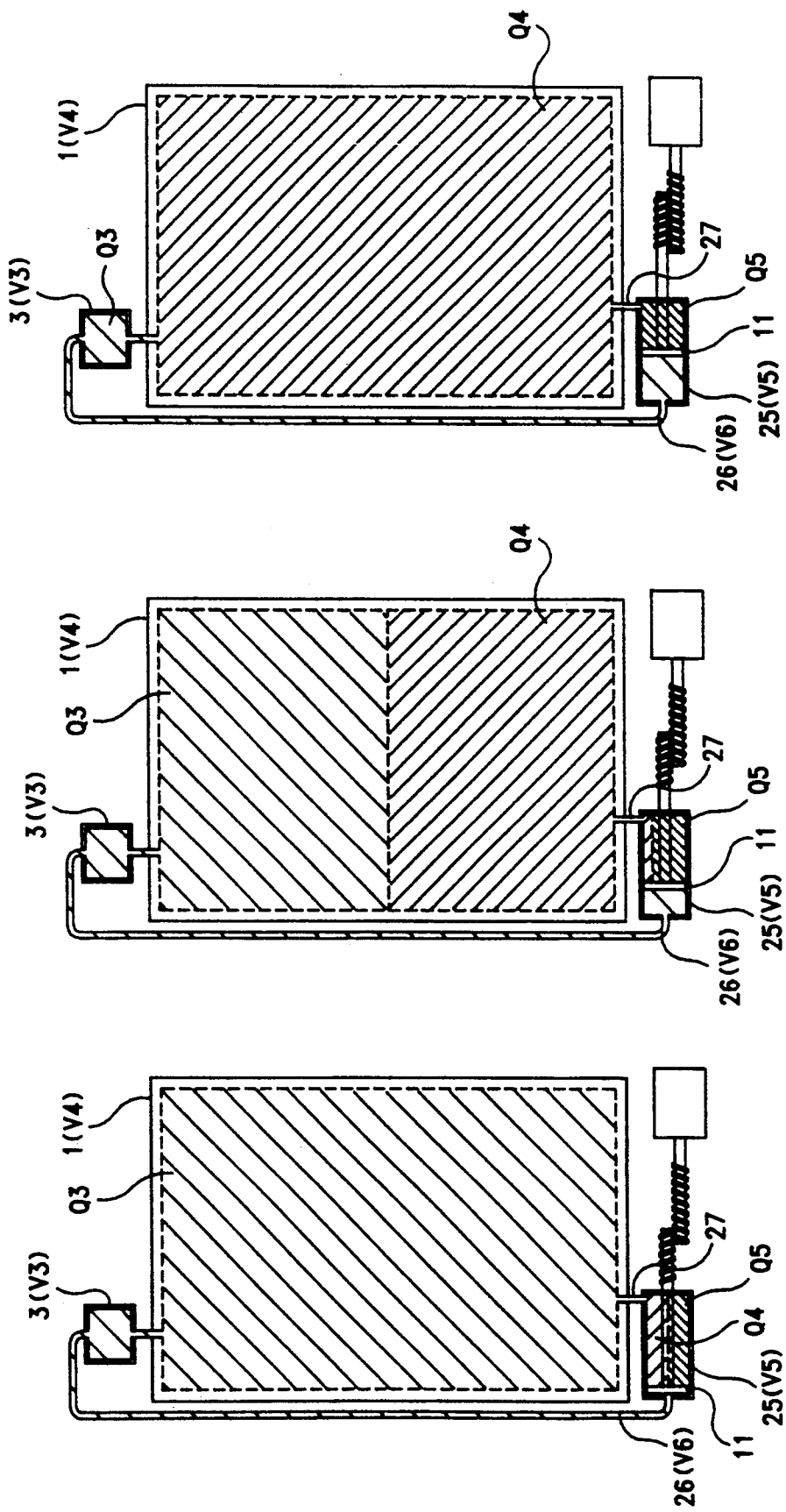

LIQUID DISPLAY DEVICE FOR REGULATING THE LIGHT PASSING THROUGH

BACKGROUND OF THE INVENTION

The present invention relates to a liquid display device which uses a piston pump assembly to reciprocate two or more kinds of liquids of different colors and different specific gravities in changing the transparency of a transparent display board so as to regulate the light passing through.

A variety of aluminum windows are widely used in buildings for admission of light. In order to blocking or regulating the light, a curtain or a venetian blind or the like may be used. However, attaching a curtain or venetian blind or the like to a window for regulating the light may destroy the sense of beauty of the building and occupy much installation space. When a curtain or a venetian blind is used, it must be regularly washed so as to keep clean. Furthermore, because regular curtains and venetian blinds are commonly made of inflammable substances, they promote the development of a fire when it broke out.

SUMMARY OF THE INVENTION

The present invention has been accomplished under the aforesaid circumstances. It is therefore an object of the present invention to provide a liquid display device which regulates the light passing through by means of changing the volume of different liquids in a water-tight compartment therein. It is another object of the present invention to provide a liquid display device which can be used as a window or partition for regulating the light passing through. It is still another object of the present invention to provide a liquid display device which produces a satisfactory sound insulating effect. It is still another object of the present invention to provide a liquid display device which is simple in structure and easy to install.

In the first embodiment of the present invention, the liquid display device comprises a transparent display board having a water-tight compartment on the inside, and a piston pump assembly driven by a reversible motor to reciprocate two liquids of different colors and different specific gravities in and out of the water-tight compartment through a water circulation system, which passes through the housing of the piston pump assembly. The liquids do not blend into each other. Therefore, reciprocating the piston of the piston pump assembly causes the liquids to flow through the water-tight compartment in changing the transparency of the transparent display board. By adding a container to the water circulation system, much liquids of different colors and different specific gravities can be moved in and out of the water-tight compartment of the transparent display board.

BRIEF DESCRIPTION OF THE DRAWINGS

FIG. 5 is a sectional front view of showing a second embodiment of a three-liquid display device of the present invention as the piston is moved to the forward limit position;

FIG. 6 is another sectional front view of the second embodiment of the present invention as the piston is moved to the ¼-stroke position; and FIG. 7 is another sectional front view of the second embodiment of the present invention as the piston is moved to the ½-stroke position.

DETAILED DESCRIPTION OF THE PREFERRED EMBODIMENT

Figure 1:
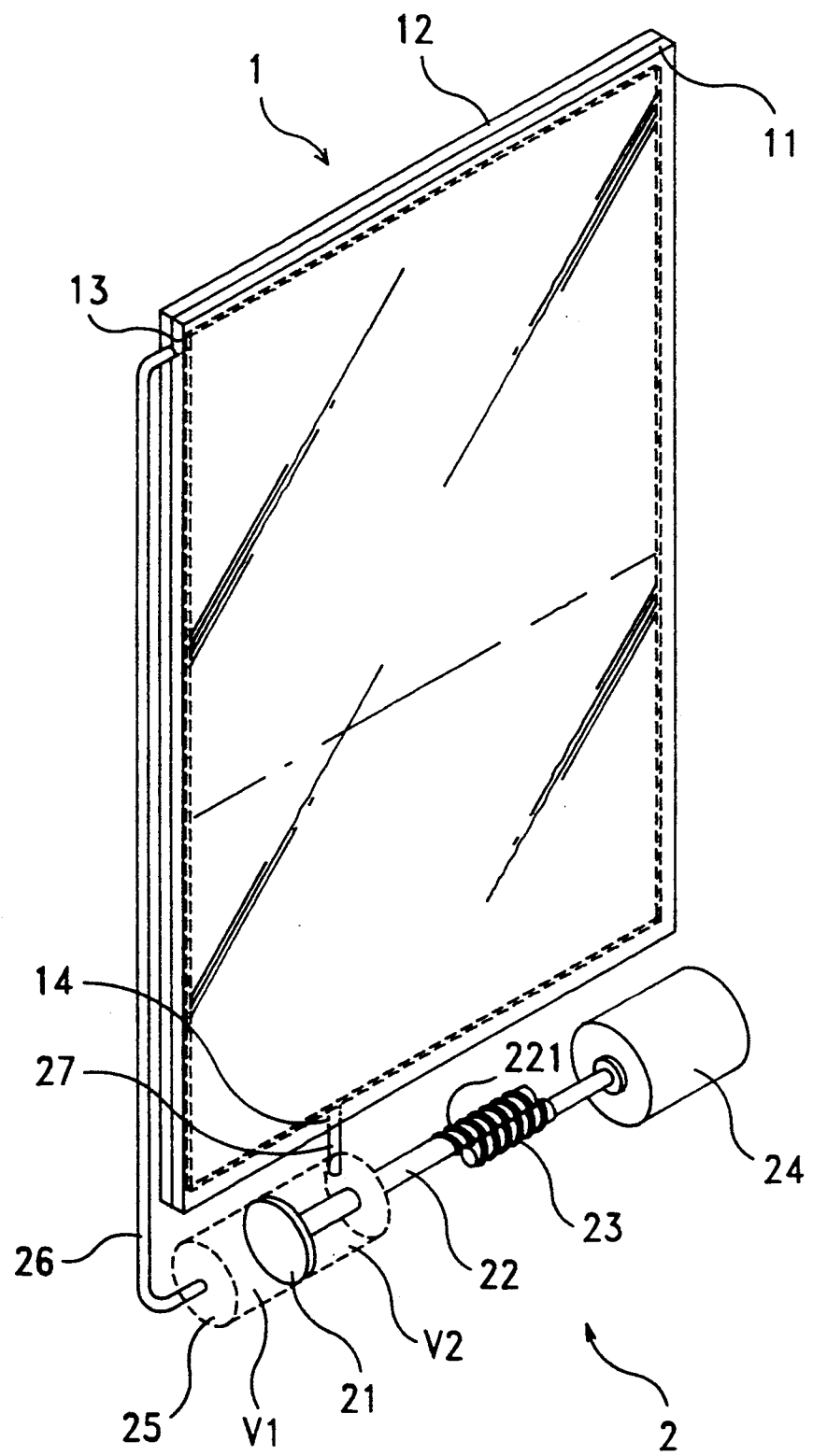
FIG 1 is a perspective view of a two-liquid display device embodying the present invention.

Referring to FIG. 1, a liquid display device as constructed in accordance with the present invention is generally comprised of a transparent display board assembly 1, and a piston pump assembly 2. The transparent display board assembly 1 is comprised of a front board 11 attached to a back board 12 defining a water-tight compartment of approximately 0.5 m/m to 1 m/m in thickness on the inside. The transparent display board assembly 1 has a first hole 13 on one side adjacent to the top edge end thereof and a second hole 14 on the bottom edge thereof. The first and second holes 13,14 are disposed in communication with the water-tight compartment for passing a liquid. The piston pump assembly 2 is comprised of a piston 21 inserted inside a water-tight housing 25 and reciprocated by a piston rod 22. The piston rod 22 has an outer thread 221 on the rear end thereof meshed with a worm 23 coupled to a reversible motor 24. The piston 21 divides the holding space of the water-tight housing 25 into a front chamber V1 and a rear chamber V2. The front chamber V1 is connected to the first hole 13 on the transparent display board assembly 1 by a first water delivery tube 26. The rear chamber V2 is connected to the second hole 14 on the transparent display board assembly 1 by a second water delivery tube 27. Rotating the reversible motor 24 on one direction causes the worm 23 to rotate the piston rod 22 forwards. Rotating the reversible motor 24 in the other direction causes the worm 23 to rotate the piston rod 22 backwards. Therefore, by means of controlling the operation of the reversible motor 24, the space of the front chamber V1 and the rear chamber V2 is relatively changed.

Figure 2:
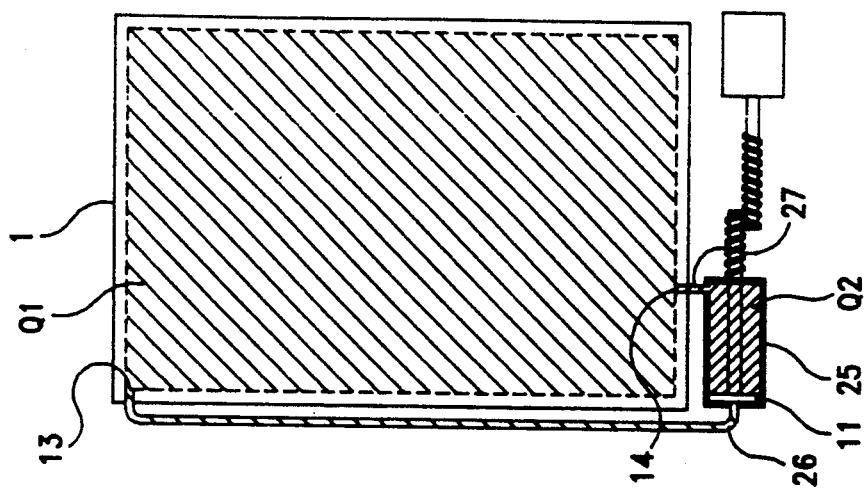
FIG. 2 is a sectional front view of the two-liquid display device of FIG. 1 as the piston is moved to the backward limit position.
Figure 3:
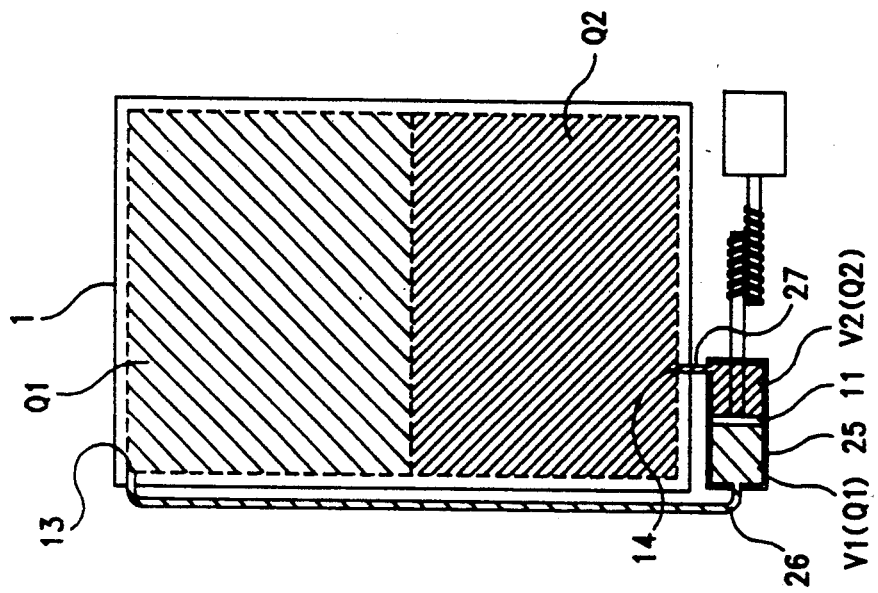
FIG. 3 is another sectional front view of the two-liquid display device of FIG. 1 as the piston is moved to the mid-stroke position.
Figure 4:
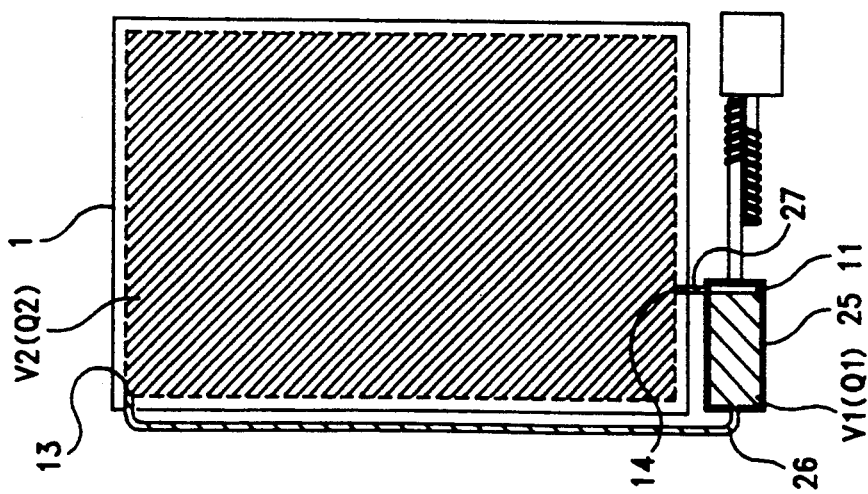
FIG. 4 is still another sectional front view of the two-liquid display device of FIG. 1 as the piston is moved to the forward limit position.
Figure 9:
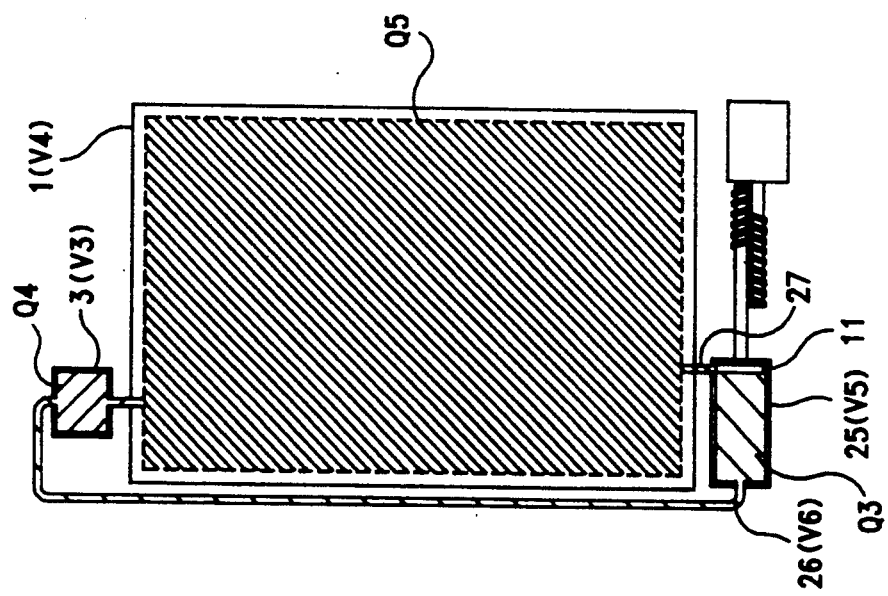
FIG. 9 is still another sectional front view of the second embodiment of the present invention as the piston is moved to the backward limit position.
Figure 8:
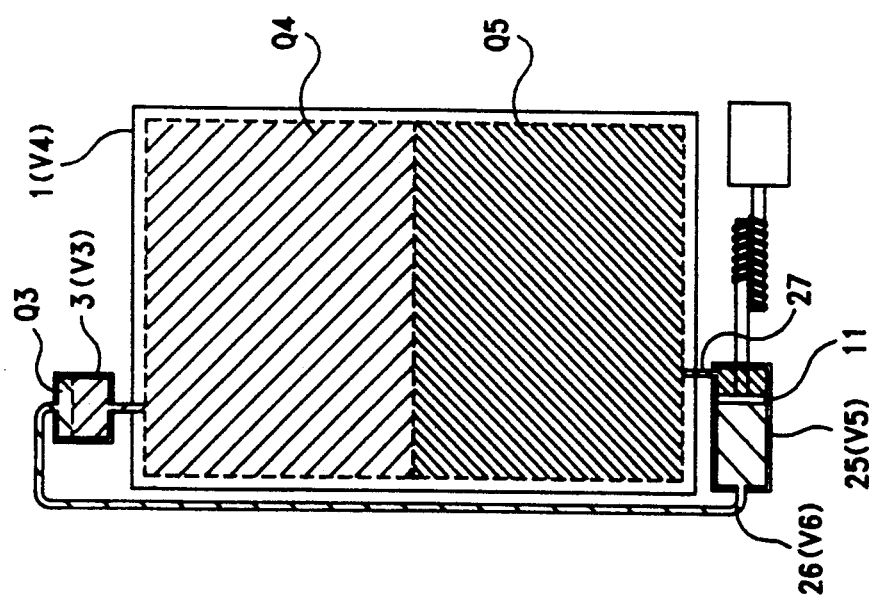
FIG. 8 is another sectional front view of the second embodiment of the present invention as the piston is moved to the ¾-stroke position.

Referring to FIG. 2, the volume of the water-tight compartment of the transparent display board assembly 1 is equal to the total volume of the front and rear chambers V1, V2. As soon as the piston 21 was moved back to the rear end of the housing 25, the second hole 14 is blocked by the piston 21. At this stage, the rear chamber V2 is approximately zero volume, and the front chamber V1 is approximately equal to the volume of the water-tight compartment of the transparent display board assembly 1. The housing 25 of the piston pump assembly 2 is filled with a first liquid Q1 of light specific gravity. The water-tight compartment of the transparent display board assembly 1 is fully filled with a second liquid Q2 of heavy specific gravity. The first and second liquids Q1,Q2 are of different colors and do not blend into each other. Referring to FIG. 3, as the piston 21 was moved toward the front end of the housing 25, the second hole 14 on the transparent display board assembly 1 is opened, and the first liquid Q1 in the housing 25 is compressed into the water-tight compartment of the transparent display board assembly 1 through the first water delivery tube 26 and the first hole 13, and at the same time, the second liquid Q2 is forced by the first liquid Q1 to flow through the second hole 14 and the second water delivery tube 27 into the rear chamber V2. Because the first and second liquids Q1,Q2 do not blend into each other, reciprocating the piston pump assembly 2 causes the two differently colored liquids Q1,Q2 to flow in the water-tight compartment of the transparent display board assembly 1 one above the other. Referring to FIG. 4, as the piston 21 was stopped at the front end of the housing 25, the water-tight compartment of the transparent display board assembly 1 becomes fully occupied by the first liquid Q1, and the second liquid Q2 becomes completely gathered in the housing 25.

According to the aforesaid principle, the present invention is thus embodied as shown in FIG. 5. A container 3 is disposed above the transparent display board assembly 1 and connected between the first water delivery tube 26 and the first hole 13. The volume V3 of the container 3 plus the volume V6 of the first water delivery tube 26 are approximately equal to the total volume V4 of the water-tight compartment of the transparent display board assembly 1. The total volume V5 of the housing 25 is twice the volume (V3+V4) of the container 3 and the water-tight compartment of the transparent display board assembly 1. As the piston 21 was moved to the forward limit position, the housing 25 is fully filed with two liquids Q4,Q5 of different colors and different specific gravities, which do not blend into each other, and the water-tight compartment of the transparent display board assembly 1, the container 3 and the first water delivery tube 26 are filled with a liquid Q3. The specific gravity of the liquid Q3 is much lighter than the liquids Q4,Q5. All the liquids Q3,Q4,Q5 are of different colors and do not blend into one another. As the piston 21 was moved backwards, the liquid Q3 is drawn through the water delivery tube 26 into the housing 25, and the liquids Q4, are forced through the second water delivery tube 26 into the water-tight compartment of the transparent display board assembly 1. As the liquid Q4 was completely compressed into the water-tight compartment of the transparent display board assembly 1, the water-tight compartment of the transparent display board assembly 1 is occupied by the liquids Q3,Q4 (see FIG. 6). Because the liquid Q3 has the specific gravity lighter than the liquid Q4, as well as liquid Q4 has the specific gravity lighter than the liquid Q5. Therefore, as soon as the piston 21 was continuously moved to the backward limit position, the three liquids Q3, Q4, Q5 share the water-tight compartment of the transparent display board assembly 1 in a sequence of Q3/Q4, Q4, Q4/Q5, and Q5 one after another (as shown in FIGS. 6,7,8, and 9). The arrangement of the container 3 facilitates the delivery of the liquid Q3 from the water-tight compartment of the transparent display board assembly 1 to the housing 25 through the first water delivery tube 26, and prohibits the liquid Q4 from flowing into the first water delivery tube 26.

What is claimed is:

1. A liquid display device comprising:
   a transparent display board assembly consisted of two transparent boards connected together with a flat, water-tight compartment defined on the inside, said water-tight compartment having a first hole on the top and a second hole on the bottom;
   a piston pump assembly having a piston reciprocated by a piston rod in a water-tight housing, a worm coupled to the output shaft of a reversible motor and meshed with an outer thread on said piston rod, said housing having a front end connected to said first hole by a first water delivery tube and a rear end connected to said second hole by a second water delivery tube; and
   wherein the volume of said water-tight compartment of said transparent display board is equal to the volume of said water-tight housing of said piston pump assembly; said water-tight compartment is filled with two liquids of different colors and different specific gravities which do not blend into each other.

2. A liquid display device comprising:
   a transparent display board assembly consisted of two transparent boards connected together with a flat, water-tight compartment defined on the inside, said water-tight compartment having a first hole on the top and a second hole on the bottom;
   a piston pump assembly having a piston reciprocated by a piston rod in a water-tight housing, a worm coupled to the output shaft of a reversible motor and meshed with an outer thread on said piston rod, said housing having a front end connected to said first hole by a first water delivery tube through an enclosed water container, and a rear end connected to said second hole by a second water delivery tube;
   wherein said water-tight housing of said piston pump assembly is filled with a plurality of liquids of different colors and specific gravities which do not blend into on another; rotating said reversible motor causes said piston to move said liquids in flowing display board assembly one after another. through said water-tight compartment of said transparent

* * * * *